Dec. 7, 1926.
J. K. CHUN FAT
DEVICE TO PREVENT OVERTURNING OF TRACTORS
Filed Nov. 15, 1923
1,609,797
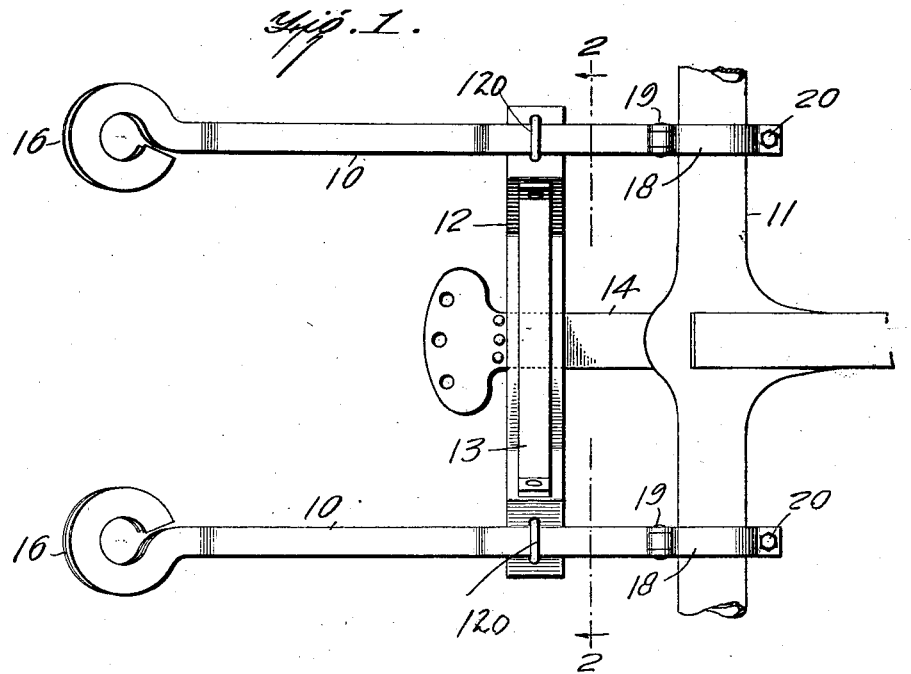
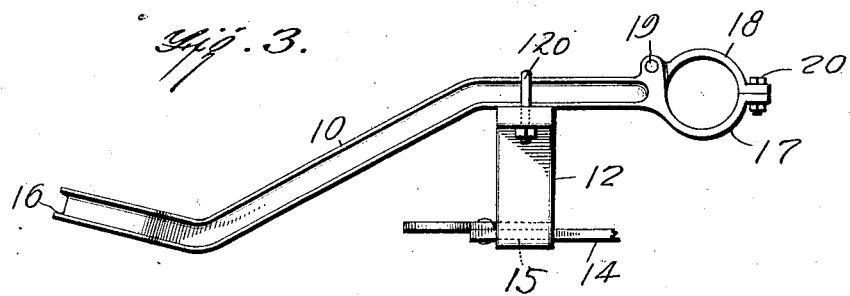
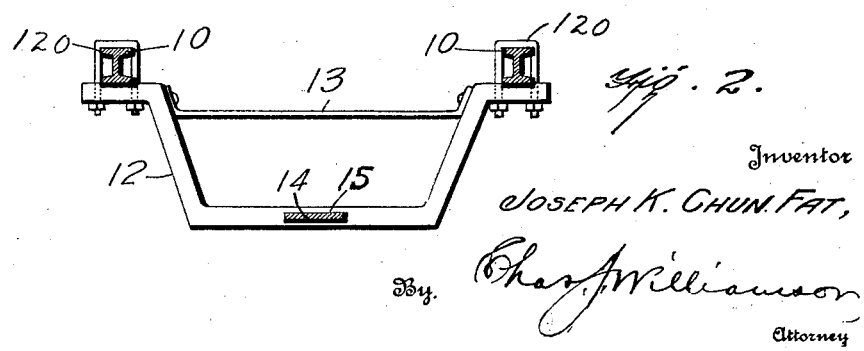
Inventor
JOSEPH K. CHUN FAT,
By Chas. J. Williamson
Attorney Patented Dec. 7, 1926.

1,609,797

UNITED STATES PATENT OFFICE.

JOSEPH K. CHUN FAT, OF HILO, TERRITORY OF HAWAII, ASSIGNOR OF ONE-HALF TO FRANK NICHOLS, OF HONOLULU, TERRITORY OF HAWAII.

DEVICE TO PREVENT OVERTURNING OF TRACTORS.

Application filed November 15, 1923. Serial No. 674,936.

The object of my invention is to provide a device for preventing the accidental overturning of tractors which will have a form that will efficiently serve the purpose intended under all conditions of use of the tractor which may subject it to overturning, be of all required strength, be capable of ready application to tractors without alteration of the construction thereof, and which consistent with the qualities mentioned may be constructed at no great cost. My invention consists in whatever is described by or is included within the terms or scope of the appended claims.

In the accompanying drawings:

Fig. 1 is a top plan view of a tractor attachment embodying my invention, a fragment of the tractor being shown;

Fig. 2 is a vertical transverse section on the line 2—2 of Fig. 1;

Fig. 3 is a side elevation of the attachment alone.

Referring in detail to the embodiment of my invention shown in the drawing it will be found to comprise a frame composed of two similar parallel bars, 10, which are attached at their forward ends to the rear axle housing, 11, so that they extend rearwardly therefrom, and a cross connection or tie, which extends between them and is rigidly secured thereto between the axle housing, 11, and their rear free ends, such cross connection comprising a downwardly bent or arched bar, 12, and a cross tie or brace, 13, which extends between the sides of said bar near the top thereof. A U-shaped bolt or shackle 120, rigidly connects the arch bar 12, and each side bar, 10. At the transverse center of the bent or arched bar, 12, a connection is made with the tractor draft or coupling bar, 14, as by means of a slot, 15, in said bent bar through which the draft bar passes and as the draft bar is comparatively wide, a substantial bearing is afforded between the same and the arched bar, 12. It will thus be seen that my device is attached to the tractor at three points, namely, a substantial distance at each side of the line of draft by connection with the rear axle housing, and midway between the points of connection with the axle housing.

Each of the rearwardly extending side bars, 10, in rear of the cross connection, is bent downwardly and rearwardly and terminates in a foot, 16, of substantial area horizonally, as by being bent or curled into an eye, and such foot is carried sufficiently near the ground to contact therewith to prevent overturning of the tractor but without touching the ground when the tractor is in its normal position.

At the forward end of each side bar, 10, is a circular clip of an internal diameter to surround the axle housing in contact therewith which clip comprises a lower fixed half, 17, and an upper movable half, 18, having a pivotal connection, 19, with the bar on which the clip may be opened for application to the axle housing or removal therefrom and the halves of the clip when encircling the axle housing are secured by a bolt, 20, which passes through overlapping lugs on the forward side of the two clip parts. This constitutes a simple, efficient and yet easily manipulated means for the ready connection of the side bars, 10, with the rear axle housing.

What I claim is:

1. A device for the purpose stated comprising a pair of bars having means for attachment to the rear axle housing of a tractor so as to extend rearward therefrom and terminating in ground-engaging extremities, a cross bar extending between and connecting said bars, said cross bar being a substantial distance forward of said extremities and means for connecting said cross bar with the tractor draw bar.

2. A device for the purpose stated comprising a pair of bars having means for attachment to the rear axle housing of a tractor so as to extend rearward therefrom and terminating in ground-engaging extremities, and a cross bar extending between and connecting said bars, said cross bar having the form of a downwardly extending arch with a brace between the sides thereof.

3. A device for the purpose stated comprising a pair of bars having means for attachment to the rear axle housing of a tractor so as to extend rearward therefrom and terminating in ground-engaging extremities, a cross bar extending between and connecting said bars, the means for engaging the axle housing comprising a clip having a fixed under portion and a movable upper portion, said cross bar being a substantial distance forward of said extremities and means for connecting said cross bar with the tractor draw bar.

4. A device for the purpose stated comprising a pair of bars having means for attachment to the rear axle housing of a tractor so as to extend rearward therefrom and terminating in ground-engaging extremities and a cross bar extending between and connecting said bars, and said cross bar engaging the tractor draw bar.

5. A device for the purpose stated comprising a pair of bars extending rearwardly from the rear axle housing, each having its own separate means for attachment to such housing, and each terminating in its own integral, expanded ground-engaging member, and the pair being situated substantial distances apart, and a cross bar connecting said pair of bars a substantial distance forward of the ground engaging portions thereof.

JOSEPH K. CHUN FAT.